A. M. KRUSE.
METALLIC RECEPTACLE.
APPLICATION FILED DEC. 13, 1915.
1,207,937.
Patented Dec. 12, 1916.
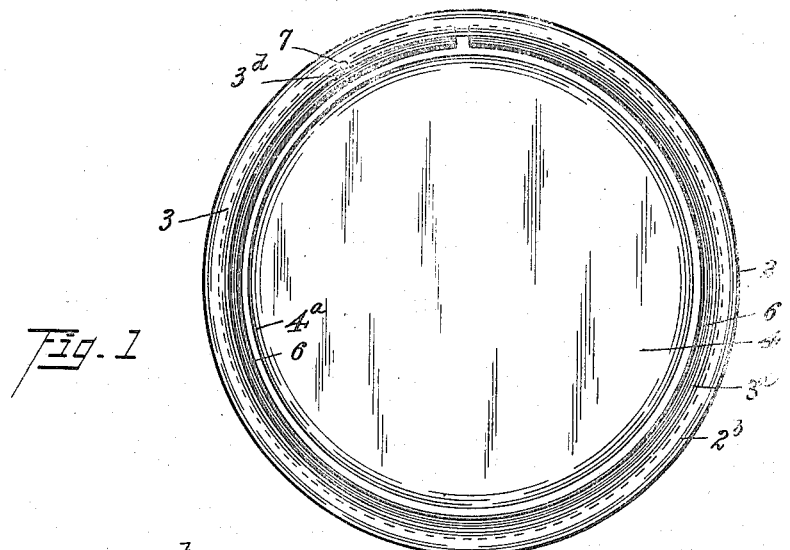
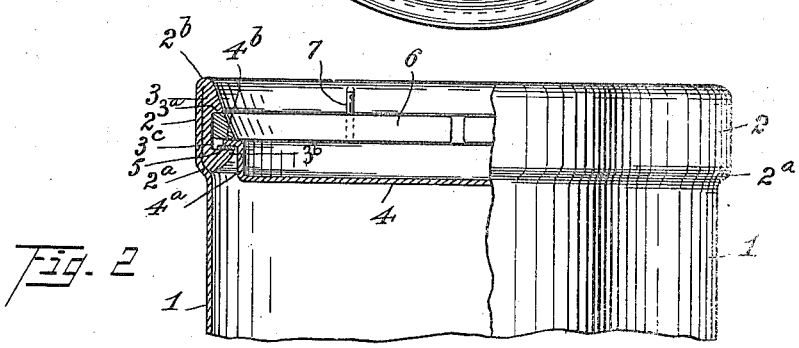
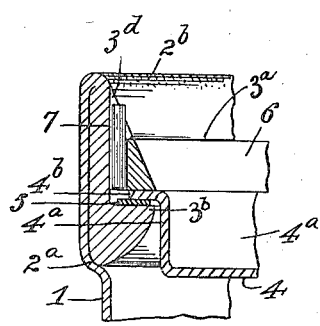
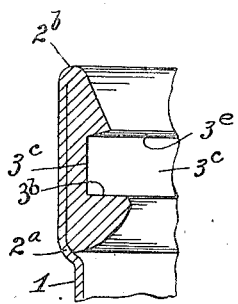
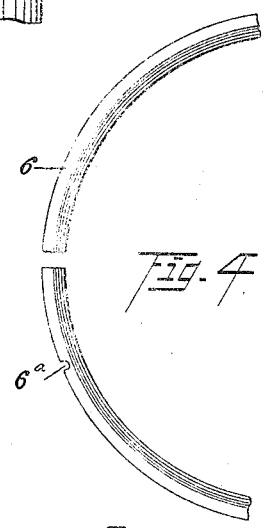
Witnesses:
Inventor
August M. Kruse

UNITED STATES PATENT OFFICE.

AUGUST M. KRUSE, OF DEFIANCE, OHIO, ASSIGNOR TO THE AMERICAN STEEL PACKAGE COMPANY, OF DEFIANCE, OHIO, A CORPORATION OF OHIO.

METALLIC RECEPTACLE.

1,207,937.   Specification of Letters Patent.   Patented Dec. 12, 1916.

Application filed December 13, 1915. Serial No. 66,451.

*To all whom it may concern:*

Be it known that I, AUGUST M. KRUSE, a citizen of the United States, residing at Defiance, in the county of Defiance and State of Ohio, have invented certain new and useful Improvements in Metallic Receptacles, of which the following is a specification.

My invention relates to improvements in metallic receptacles, and more particularly to removable heads or covers for metallic vessels or containers,—such for example as metallic barrels as shown in the present embodiment of this invention.

The primary object of the invention is to provide a generally improved removable head for fluid tight metallic barrels, together with improved means for securely locking and unlocking or removing said head, the present form being particularly designed and adapted for use in connection with a metallic barrel of the general form or type disclosed and claimed in my Patent No. 1,090,218 of March 17th, 1914.

In carrying out my invention, I preferably provide the cylindrical barrel body with a slightly off-set or shouldered chime welding rim as in my said patent, and then mount therein an improved reinforcing or head supporting chime ring welded to said chime welding rim, and provide a removable head together with means for removably mounting and securing said head in said reinforcing chime ring, such means, in the present instance, including an annular groove in such chime ring and a split expansible locking ring adapted to be seated in said annular groove and about the marginal edges of said head, suitable annular head and ring supporting shoulders or flanges being also provided in the reinforcing chime rim or band for coöperating with adjacent parts as hereinafter described in detail.

With the above mentioned and other ends in view, the invention consists in the novel construction, arrangement, and combination of parts, hereinafter described, illustrated in one of its embodiments in the accompanying drawings, and particularly pointed out in the appended claims.

Referring to the drawings, forming a part of this specification, Figure 1, is a top plan view of a metallic vessel or receptacle, in the present instance, in the form of a metallic barrel embodying the improved removable head or cover. Fig. 2, a view of the same, partly in vertical section and partly in side elevation. Fig. 3, an enlarged detail cross sectional view of the chime and head and head securing locking portion of the vessel, and illustrating more particularly a pin or key member which may be used for preventing any circumferential movement of the split locking ring when the latter is in its securing or normal position. Fig. 4, a fragmentary top plan view of the split portion of the head securing locking ring, detached. Fig. 5, a cross sectional view of a slightly modified form of reinforcing chime or rim, the head and split locking ring being detached.

Similar numerals of reference designate like parts throughout all the figures of the drawings.

As applied to receptacles or vessels in the specific form of a metallic barrel, the cylindrical main body portion or barrel body 1, is preferably provided at its ends with chime welding rims 2, the latter being preferably slightly off-set forming supporting shoulders $2^a$, as in my previous patent hereinbefore referred to. As in my said previous patent, the improved barrel is provided with reinforcing chime welding rims and reinforcing elements or rings presenting advantageously disposed welding edges for modern methods of welding such as "autogenous" and other welding processes, said welding edges being adapted to coöperate with the reinforcing elements or rings in giving great strength and rigidity to the head and chime portions of the barrel.

In providing the improved removable head, and means for securing the same in the barrel, a grooved and flanged or shouldered chime ring 3, is mounted on the supporting shoulder $2^a$, and arranged within and welded to the welding edge of the chime welding rim 2, as indicated by the welded portion $2^b$, so that this portion of the barrel will be given the requisite strength and will correspond substantially in exterior appearance to the opposite end of the barrel having the permanently attached head substantially as shown in my said previous patent.

As a means of properly receiving supporting and locking the improved removable head hereinafter referred to, the improved reinforcing chime ring or band 3, is provided with a pair of inwardly extending spaced flanges or shoulders 3ª, and 3ᵇ, respectively, the shoulders 3ª, and 3ᵇ, affording an intermediate annular groove or recess 3ᶜ.

The improved removable head 4, is adapted to be seated in the groove or recess 3ᶜ, and to rest upon and to be supported by the shoulder 3ᵇ, said removable head 4, being preferably provided with an annular shoulder 4ª, adapted to be seated within the shoulder 3ᵇ, to centralize the removable head 4, and to prevent substantial lateral movement, and the annular shoulder 4ª, terminates in a flanged rim portion 4ᵇ, and as a means of rendering the vessel fluid tight an annular gasket 5, may be interposed between the flanged or rim portion 4ᵇ, and the supporting shoulder 3ᵇ, as shown in Figs. 2 and 3 of the drawings.

As a means of removably securing or locking the head 4, within the chime ring 3, an improved split head retaining locking ring 6, is provided, said ring being an expansible ring and having its split or adjacent ends normally spaced from each other so that the ring may be readily contracted or reduced in diameter in the act of inserting it in the grooved portion of the chime ring 3, after the head 4, is first inserted therein. The split expansible locking ring 6, is adapted to rest upon the rim portion 4ᵇ, of the head 4, and to be seated within the groove 3ᶜ, and to rest beneath the ring supporting shoulder 3ª, as shown most clearly in Fig. 2 of the drawings. It will be observed that the ring supporting shoulder 3ª, is of less diameter than the head supporting shoulder 3ᵇ, the ring supporting shoulder 3ª, as to its inner diameter, being also of less diameter than the head 4, so that the latter may be readily inserted, after which the split expansible ring may be readily contracted and inserted in the groove 3ᶜ, of the chime ring 3, in an obvious manner.

As a convenient means of preventing the circumferential movement of the split ring 6, in the act of inserting or removing the same, or after the same is inserted, one of the ends of the ring 6, may be provided with a recess 6ª, (see Fig. 4) to receive and contain a locking pin 7, projecting upwardly and resting in a vertically extending slot or recess 3ᵈ, of the chime ring 3, said pin 7, acting as a key member to prevent relative movement circumferentially between the ring 6, and the chime ring 3.

If desired, the ring supporting shoulder 3ª, may be slightly beveled or inclined as at 3ᵉ, in Fig. 5 of the drawings, for the purpose of further assisting the split expansible ring in catching and holding the marginal edges of the head of the shoulder 3ᵇ, and against the gasket 5, and it is also obvious that the ring itself might be correspondingly beveled for a similar purpose.

From the foregoing description, taken in connection with the accompanying drawings, the operation and advantages of my invention will be readily understood.

Having thus described one of the embodiments of my invention, what I claim and desire to secure by Letters Patent, is,—

1. In a metallic receptacle, the combination with a cylindrical receptacle provided with an internally flanged and grooved welding ring; of a flanged and shouldered removable head mounted within and seated on the flanged portion of said ring, and a split expansible head retaining locking ring seated in the grooved portion of said reinforcing ring and provided with means for preventing the circumferential movement of the same while being inserted.

2. In a metallic receptacle, a cylindrical vessel provided with a chime welding rim, a reinforcing flanged and grooved chime ring seated in and welded to said chime welding rim, a removable head having shouldered and flanged portions resting upon and within the flanged and grooved portions of said chime ring, respectively, and a split locking ring interposed between the grooved portion of said chime rim and the flanged portion of said head.

3. In a metallic vessel, a cylindrical body provided with a reinforcing chime ring having circumferential groove and inwardly extending annular head and ring supporting shoulders, a head provided with an annular shoulder and off-set rim abutting against and resting on said head supporting shoulder, said off-set rim resting in said circumferential groove below said ring supporting shoulder and being of less diameter than the inner diameter of the latter, and a split locking ring seated in said groove and interposed between said ring supporting shoulder and said off-set rim of said head.

4. In a metallic receptacle, a cylindrical vessel, provided with a chime welding rim and shoulders, a grooved and flanged chime ring mounted on said shoulders and arranged within and welded to said chime welding rim, a head having a shouldered portion resting within said ring and terminating in a flanged rim resting within the grooved portion of the latter, a split expansible locking ring resting on said flanged rim and seated in said grooved portion of said chime ring, and means for preventing the circumferential movement of said ring relative to said chime ring when being inserted.

5. In a metallic receptacle, a cylindrical vessel, a grooved shouldered chime welding ring arranged within and welded to the rim portion of said cylindrical vessel, a head having a shouldered portion resting against and interlocking with the shouldered portion of said ring and terminating in a flanged rim resting within the grooved portion of the latter, a split expansible locking ring resting on said flanged rim and seated in said grooved portion of said chime ring, and a key member between the latter and said locking ring for preventing circumferential movement of the latter relative to said chime ring.

In testimony whereof I have affixed my signature in the presence of two witnesses.

AUGUST M. KRUSE.

Witnesses:
MELL D. CAMPBELL,
CURTIS M. WILLOCK.